(12) United States Patent
Yamamoto et al.

(10) Patent No.: US 9,518,811 B2
(45) Date of Patent: Dec. 13, 2016

(54) FORM MEASURING MACHINE

(71) Applicant: MITUTOYO CORPORATION, Kanagawa (JP)

(72) Inventors: Takeshi Yamamoto, Zama (JP); Sadayuki Matsumiya, Sagamihara (JP); Atsushi Shimaoka, Kawasaki (JP); Kazuhiko Hidaka, Hino (JP); Tomoyuki Miyazaki, Kawasaki (JP); Yasunori Mori, Kure (JP)

(73) Assignee: MITUTOYO CORPORATION, Kanagawa (JP)

( * ) Notice: Subject to any disclaimer, the term of this patent is extended or adjusted under 35 U.S.C. 154(b) by 141 days.

(21) Appl. No.: 14/669,667

(22) Filed: Mar. 26, 2015

(65) Prior Publication Data
US 2015/0292851 A1 Oct. 15, 2015

(30) Foreign Application Priority Data
Apr. 9, 2014 (JP) .................................. 2014-079997

(51) Int. Cl.
*G01B 5/20* (2006.01)
*G01B 3/00* (2006.01)

(52) U.S. Cl.
CPC ................. *G01B 3/008* (2013.01); *G01B 5/20* (2013.01)

(58) Field of Classification Search
CPC .................................. G01B 3/008; G01B 5/20
USPC .................... 33/533, 534, 832, 834
See application file for complete search history.

(56) References Cited

U.S. PATENT DOCUMENTS

| | | | | |
|---|---|---|---|---|
| 4,340,069 A * | 7/1982 | Yeaple | ................... | G01B 3/008 33/514 |
| 4,377,911 A * | 3/1983 | Iida | ......................... | G01B 7/28 33/551 |
| 4,669,300 A * | 6/1987 | Hall | ......................... | G01B 7/28 33/551 |
| 5,146,690 A * | 9/1992 | Breitmeier | ............... | G01B 7/34 33/501.03 |
| 6,209,217 B1 * | 4/2001 | Tsuruta | .................... | G01B 5/20 33/551 |
| 6,295,866 B1 | 10/2001 | Yamamoto et al. | | |

(Continued)

FOREIGN PATENT DOCUMENTS

| | | |
|---|---|---|
| JP | 11-141537 | 5/1999 |
| JP | 2000-74616 | 3/2000 |

*Primary Examiner* — G. Bradley Bennett
(74) *Attorney, Agent, or Firm* — Greenblum & Bernstein, P.L.C.

(57) ABSTRACT

A measuring force includes a stem, an arm, a detector, a rotation fulcrum, and a measuring force adjuster. A probe which makes contact with a workpiece is provided on the stem. An end portion of the arm is joined to the stem. The rotation fulcrum acts as a fulcrum for a rotating motion of the stem and the arm. The detector detects a displacement amount of the rotating motion of the arm. A crossed spring of the rotation fulcrum imparts on the stem and the arm a torque around an axis of the rotating motion in accordance with the displacement amount of the rotating motion. The measuring force adjuster imparts on the arm and the stem a torque, in a reverse direction of the torque generated by the crossed spring, by an attraction force generated by a magnetic force between at least two magnetic members mutually arranged at opposite ends.

19 Claims, 13 Drawing Sheets

(56) References Cited

U.S. PATENT DOCUMENTS

| | | | | |
|---|---|---|---|---|
| 6,874,243 B2* | 4/2005 | Hama | ............... | G01B 5/28 |
| | | | | 33/551 |
| 6,901,678 B2* | 6/2005 | Kubota | ............ | G01B 5/20 |
| | | | | 33/551 |
| 8,161,657 B2* | 4/2012 | Yamamoto | ......... | G01B 3/008 |
| | | | | 33/554 |
| 8,701,301 B2* | 4/2014 | Nakayama | ......... | G01B 3/008 |
| | | | | 33/554 |
| 9,285,201 B2* | 3/2016 | Matsumiya | ......... | G01B 7/34 |
| 2014/0109423 A1* | 4/2014 | Hidaka | ............ | G01B 5/016 |
| | | | | 33/556 |
| 2015/0075020 A1 | 3/2015 | Mori et al. | | |
| 2015/0082926 A1 | 3/2015 | Onodera et al. | | |
| 2016/0040972 A1* | 2/2016 | Gowen | ............ | G01B 7/281 |
| | | | | 33/503 |
| 2016/0258732 A1* | 9/2016 | Hidaka | ............ | G01B 3/002 |
| 2016/0290797 A1* | 10/2016 | Bos | ................ | G01B 21/04 |

* cited by examiner

FORM MEASURING MACHINE

CROSS-REFERENCE TO RELATED APPLICATIONS

The present application claims priority under 35 U.S.C. §119 of Japanese Application No. 2014-079997, filed on Apr. 9, 2014, the disclosure of which is expressly incorporated by reference herein in its entirety.

BACKGROUND OF THE INVENTION

1. Field of the Invention

The present invention relates to a form measuring machine such as a form measuring machine using a lever-type detector.

2. Description of Related Art

Nowadays, form measuring machines having lever-type detectors are in widespread use. For example, form measuring machines such as contour shape measuring machines, surface texture measuring machines, and roundness measuring machines are known.

When a crossed spring is incorporated into a rotation axis of such a lever-type detector, a measurement value with little hysteresis and high reproducibility can be obtained. However, since a measuring force changes according to a measurement position, deviation of measurement values easily occurs. Further, although measurement can be performed by low measuring force as a way to inhibit deformation of or damages to a workpiece (object to be measured), there is an issue with respect to responsiveness (a speed with which a probe follows a shape of the workpiece upon sweeping the workpiece). Measurement precision, however, does not deteriorate much by the use of low measuring force.

By contrast, a technique for stabilizing measuring force is known, in which fluctuation of the measuring force of the lever-type detector is inhibited by detecting and controlling the measuring force (see, e.g., Japanese Patent Laid-open Publication No. 2000-74616).

In addition, a technology is proposed for a measuring device using an elastic mechanism in which a restoring characteristic of an elastic hinge is adjusted using magnets (see, e.g., Japanese Patent Laid-open Publication No. H11-141537).

However, inventors of the present invention have discovered an issue, discussed below, with respect to the above-noted techniques. In the technique disclosed in Japanese Patent Laid-open Publication No. 2000-74616, controlling the measuring force generates heat, which affects the form measuring machine in the form of thermal deformation and the like and leads to a decrease in measurement precision. In addition, electrical noise is generated by executing control of the measuring force, which leads to a further decrease in measurement precision. Furthermore, a need to mount a controller on the form measuring machine increases costs of the form measuring machine.

In the technique disclosed in Japanese Patent Laid-open Publication No. H11-141537, stabilization of the measuring force is not considered in the first place; thus, the technique in its current state does not achieve stabilization of measuring force in the form measuring machine.

SUMMARY OF THE INVENTION

The present invention was conceived in light of the circumstances above, and the present invention stabilizes the measuring force of the form measuring machine by a simple configuration.

One aspect of the present invention is a form measuring machine that includes a first member provided with a probe which makes contact with a workpiece, a second member having one end portion thereof joined to an end portion of the first member, a rotation fulcrum which acts as a fulcrum for a rotating motion of the first member and the second member, a detector which detects a displacement amount of the rotating motion of the second member, an elastic member which imparts on the first member and the second member a torque around an axis of the rotating motion in accordance with the displacement amount of the rotating motion, and a measuring force adjuster which imparts on the first member and the second member a torque, in a reverse direction of the torque generated by the elastic member, by an attraction force generated by a magnetic force between at least two magnetic members mutually arranged at opposite ends. Accordingly, the measuring force is a combined torque composed of the two torques in opposing directions generated in the elastic member and the measuring force adjuster. Further, since the two torques in opposing directions increase in accordance with the displacement amount detected by the detector, the measuring force composed of the combined torque can be stabilized regardless of the displacement amount.

Another aspect of the present invention is the above-noted form measuring machine in which the elastic member is a crossed spring incorporated into the rotation fulcrum, and in a state where the crossed spring does not impart torque on the first member and the second member, the measuring force adjuster imparts on the first member and the second member a torque in a first direction so that the probe is pressed against the portion to be measured. Accordingly, the rotation fulcrum and the elastic member can be integrated, thereby enabling a configuration of the form measuring machine to be compact.

Another aspect of the present invention is the above-noted form measuring machine where, in a case where the crossed spring imparts on the first member and the second member the torque in the first direction, the torque generated by the crossed spring is larger than the torque generated by the measuring force adjuster; and in a case where the crossed spring imparts on the first member and the second member a torque in a second direction which is opposite to the first direction, the torque generated by the crossed spring is smaller than the torque generated by the measuring force adjuster. Accordingly, measuring force in a constant direction can be imparted on the object to be measured regardless of the displacement amount detected by the detector.

Another aspect of the present invention is the above-noted form measuring machine in which the measuring force adjuster includes a first fixating part joined to the second member, a second fixating part whose relative position with respect to the rotation fulcrum is fixated, a first magnetic member fixed to the first fixating part, a second magnetic member fixed to the second fixating part so that an attraction force in a circumferential direction of the rotating motion is generated between the first magnetic member and the second magnetic member, a third magnetic member fixed to the first fixating part, and a fourth magnetic member fixed to the second fixating part so that an attraction force in the circumferential direction of the rotating motion is generated between the third magnetic member and the fourth magnetic member. The third magnetic member is arranged so as to face the first magnetic member in the circumferential direction of the rotating motion via the first fixating part. Accordingly, the attraction force between the two mutually opposing magnetic members can be generated, and the magnitude of the attraction force can be changed by changing the distance between the two magnetic members. Thus, the torque in the opposite direction of the torque generated by the elastic member can be generated, and the magnitude of the torque in the opposite direction can be changed in accordance with the magnitude of the torque generated by the elastic member.

Another aspect of the present invention is the above-noted form measuring machine in which at least one of the first magnetic member and the second magnetic member has a tapered shape whose cross section becomes smaller toward the other magnetic member, and at least one of the third magnetic member and the fourth magnetic member has a tapered shape whose cross section becomes smaller toward the other magnetic member. Accordingly, changes in the attraction force between the two mutually opposing magnetic members can be adjusted by the shape of the magnetic members. Thus, changes in the attraction force between the two mutually opposing magnetic members which occur in accordance with changes in the distance between the two magnetic members can be made to be more linear, for example.

Another aspect of the present invention is the above-noted form measuring machine in which, at least one of the first magnetic member and the second magnetic member is a permanent magnet, and at least one of the third magnetic member and the fourth magnetic member is a permanent magnet. Accordingly, the attraction force between the two mutually opposing magnetic members can be generated.

Another aspect of the present invention is the above-noted form measuring machine in which at least one of a distance between the first magnetic member and the second magnetic member and a distance between the third magnetic member and the fourth magnetic member is changeable in accordance with measurement conditions and is constant when measuring the workpiece. Accordingly, the distance between the two mutually opposing magnetic members can be set and the magnitude of the measuring force can be adjusted before commencing measurement of the workpiece. Thus, responsiveness of the measurement can be adjusted in accordance with required measurement conditions.

Another aspect of the present invention is the above-noted form measuring machine in which the measuring force adjuster includes a fifth magnetic member joined to the second member, and a sixth magnetic member separated from the fifth magnetic member and arranged so that an attraction force in a direction intersecting with the circumferential direction of the rotating motion is generated between the fifth magnetic member and the sixth magnetic member. A relative position of the sixth magnetic member with respect to the rotation fulcrum is fixated. A distance between the fifth magnetic member and the sixth magnetic member is largest when a center portion of the sixth magnetic member in the circumferential direction of the rotating motion faces the fifth magnetic member and smallest when a position of the sixth magnetic member facing the fifth magnetic member moves away from the fifth magnetic member in the circumferential direction of the rotating motion. Accordingly, the attraction force between the two mutually opposing magnetic members can be generated, and the magnitude of the attraction force can be changed by changing the distance between the two magnetic members. Thus, the torque in the opposite direction of the torque generated by the elastic member can be generated, and the magnitude of the torque in the opposite direction can be changed in accordance with the magnitude of the torque generated by the elastic member.

Another aspect of the present invention is the above-noted form measuring machine that further includes magnetic fluid inserted between the fifth magnetic member and the sixth magnetic member. Accordingly, the attraction force between the two mutually opposing magnetic members can be increased.

Another aspect of the present invention is the above-noted form measuring machine in which at least one of the fifth magnetic member and the sixth magnetic member is a permanent magnet. Accordingly, the attraction force between the two mutually opposing magnetic members can be generated.

Another aspect of the present invention is the above-noted form measuring machine in which a distance between the fifth magnetic member and the sixth magnetic member is changeable in accordance with measurement conditions and is constant when measuring the workpiece. Accordingly, the distance between the two mutually opposing magnetic members can be set and a magnitude of the measuring force can be adjusted before commencing measurement of the workpiece. Thus, responsiveness of the measurement can be adjusted in accordance with required measurement conditions.

Another aspect of the present invention is the above-noted form measuring machine that further includes a seventh magnetic member separated from the fifth magnetic member and arranged so that an attraction force in a direction intersecting with the circumferential direction of the rotating motion is generated between the fifth magnetic member and the seventh magnetic member. A relative position of the seventh magnetic member with respect to the rotation fulcrum is fixated. A distance between the fifth magnetic member and the seventh magnetic member is largest when the center portion of the seventh magnetic member in the circumferential direction of the rotating motion faces the fifth magnetic member and smallest when a position of the seventh magnetic member facing the fifth magnetic member moves away from the fifth magnetic member in the circumferential direction of the rotating motion. The sixth magnetic member and the seventh magnetic member are arranged so as to face each other with the fifth magnetic member therebetween. Accordingly, the attraction force between the two mutually opposing magnetic members can be generated, and the magnitude of the attraction force can be changed by changing the distance between the two magnetic members. Thus, the torque in the opposite direction of the torque generated by the elastic member can be generated, and the magnitude of the torque in the opposite direction can be changed in accordance with the magnitude of the torque generated by the elastic member.

Another aspect of the present invention is the above-noted form measuring machine that further includes magnetic fluid inserted between the fifth magnetic member and the seventh magnetic member. Accordingly, the attraction force between the two mutually opposing magnetic members can be increased.

Another aspect of the present invention is the above-noted form measuring machine in which at least one of the fifth magnetic member and the seventh magnetic member is a permanent magnet. Accordingly, the attraction force between the two mutually opposing magnetic members can be generated.

Another aspect of the present invention is the above-noted form measuring machine in which a distance between the fifth magnetic member and the seventh magnetic member is changeable in accordance with measurement conditions and is constant when measuring the workpiece. Accordingly, the distance between the two mutually opposing magnetic members can be set and the magnitude of the measuring force can be adjusted before commencing measurement of the workpiece. Thus, responsiveness of the measurement can be adjusted in accordance with required measurement conditions.

Another aspect of the present invention is the above-noted form measuring machine in which one end of the elastic member is fixed to the second member and a relative position of another end of the elastic member with respect to the rotation fulcrum is fixated, and the elastic member imparts on the second member a torque in a direction with which the probe is pushed against the workpiece. The measuring force adjuster includes a third fixating part joined to the second member, a fourth fixating part whose relative position with respect to the rotation fulcrum is fixated, an eighth magnetic member fixed to the third fixating part, and a ninth magnetic member fixed to the fourth fixating part so that an attraction force in the circumferential direction of the rotating motion is generated between the eighth magnetic member and the ninth magnetic member. Accordingly, the attraction force between the two mutually opposing magnetic members can be generated, and the magnitude of the attraction force can be changed by changing the distance between the two magnetic members. Thus, the torque in the opposite direction of the torque generated by the elastic member can be generated, and the magnitude of the torque in the opposite direction can be changed in accordance with the magnitude of the torque generated by the elastic member.

Another aspect of the present invention is the above-noted form measuring machine in which at least one of the eighth magnetic member and the ninth magnetic member has a tapered shape whose cross section becomes smaller toward the other magnetic member. Accordingly, changes in the attraction force between the two mutually opposing magnetic members can be adjusted by the shape of the magnetic members. Thus, changes in the attraction force between the two mutually opposing magnetic members which occur in accordance with changes in the distance between the two magnetic members can be made to be more linear, for example.

Another aspect of the present invention is the above-noted form measuring machine in which at least one of the eighth magnetic member and the ninth magnetic member is a permanent magnet. Accordingly, the attraction force between the two mutually opposing magnetic members can be generated.

Another aspect of the present invention is the above-noted form measuring machine in which a distance between the eighth magnetic member and the ninth magnetic member is changeable in accordance with measurement conditions and is constant when measuring the workpiece. Accordingly, the distance between the two mutually opposing magnetic members can be set and the magnitude of the measuring force can be adjusted before commencing measurement of the workpiece. Thus, responsiveness of the measurement can be adjusted in accordance with required measurement conditions.

According to the present invention, the measuring force of the form measuring machine can be stabilized by a simple configuration.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
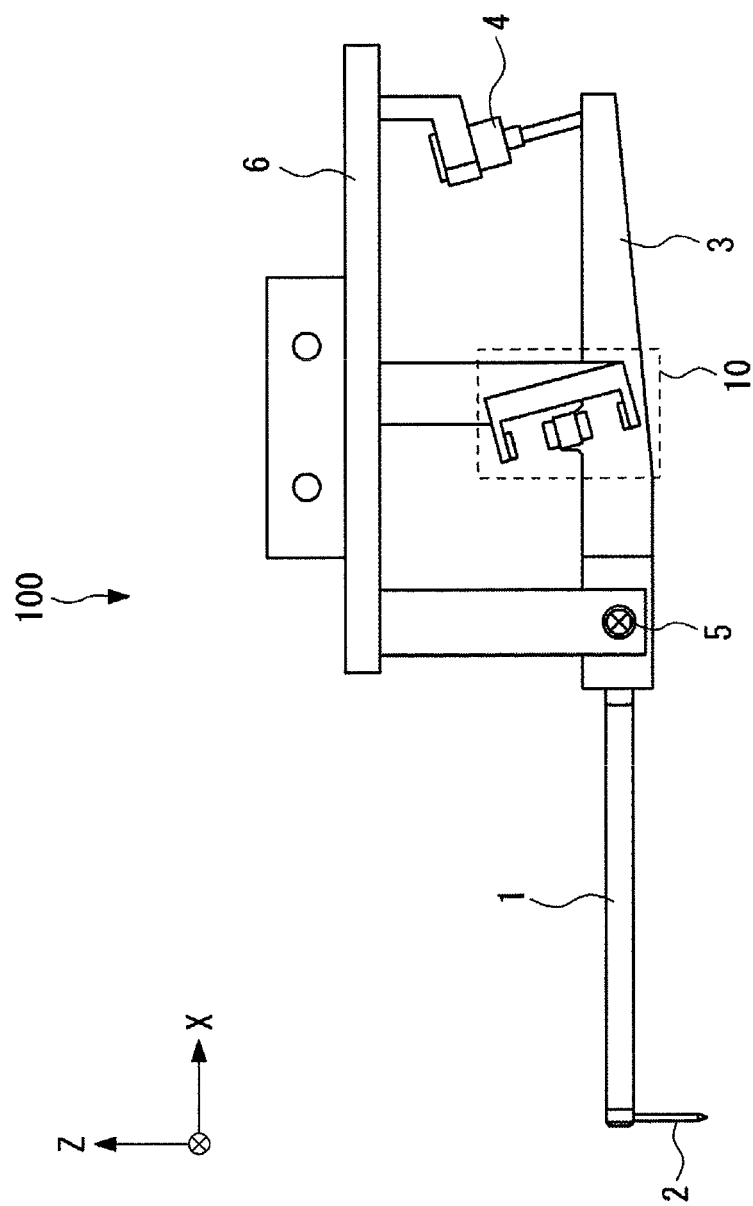
FIG. 1 is a front view schematically illustrating a configuration of a form measuring machine according to a first embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, embodiments of the present invention are described with reference to the drawings. Identical reference numerals are assigned to identical elements in each of the drawings, and duplicative descriptions are omitted where necessary.

First Embodiment

First, a description is given of a form measuring machine 100 according to a first embodiment. FIG. 1 is a front view schematically illustrating a configuration of the form measuring machine 100 according to the first embodiment. The form measuring machine 100 has a stem 1 (also referred to as a first member), a probe 2, an arm 3 (also referred to as a second member), a detector 4, a rotation fulcrum 5, a measuring machine body 6, and a measuring force adjuster 10. In FIG. 1, a horizontal direction (left-to-right direction) of the form measuring machine 100 is indicated as an X direction, a depth direction relative to a plane of paper starting from the front side of the paper to the top side of the paper is indicated as a Y direction, and a vertical direction of the form measuring machine 100 (bottom-to-top direction along a perpendicular line) is indicated as a Z direction.

The stem 1 is a member extending in the X direction and on one tip has the probe 2 protruding toward a Z (−) side. A tip of the probe 2 (end portion on the Z (−) side of the probe 2 in FIG. 1) makes contact with a workpiece (object to be measured) when measuring the form of the workpiece.

The arm 3 is a member extending in the X direction. The stem 1 is inserted to one end of the arm 3 (end portion on an X (−) side of the arm 3 in FIG. 1) and the detector 4 is joined to the other end (end portion on an X (+) side of the arm 3 in FIG. 1). In addition, a vicinity of the end portion of the arm 3 with the stem 1 inserted thereto (end portion on the X (−) side of the arm 3 in FIG. 1) is joined to the rotation fulcrum 5. Thus, the stem 1 and the arm 3 are configured so as to be rotatable about the rotation fulcrum 5 (i.e., rotatable about a rotation axis in the Y direction). It is noted that, in order to avoid interference with the workpiece when measuring, in FIG. 1, the Z (−) side surface of the arm 3 is inclined upward so that the arm 3 becomes narrower toward the X (+) side. However, this is an example of a configuration to avoid interference with the workpiece when measuring and is not an illustration of a required shape of the arm 3.

The detector 4 detects when measuring a rotation displacement of the arm 3 from a reference position of the arm 3 having the rotation fulcrum 5 as a support point. The reference position refers to a position in which the rotation displacement of the arm 3 detected by the detector 4 is "0."

The rotation fulcrum 5 has a crossed spring (also referred to as an elastic member or biaser) incorporated thereinto and is fixed to the measuring machine body 6. As a result, when displacement of the probe 2 causes the stem 1 and the arm 3 to be rotationally displaced from the reference position, a torque in the opposite direction of the rotation direction of the stem 1 and the arm 3 is generated by the crossed spring of the rotation fulcrum 5.

Figure 2:
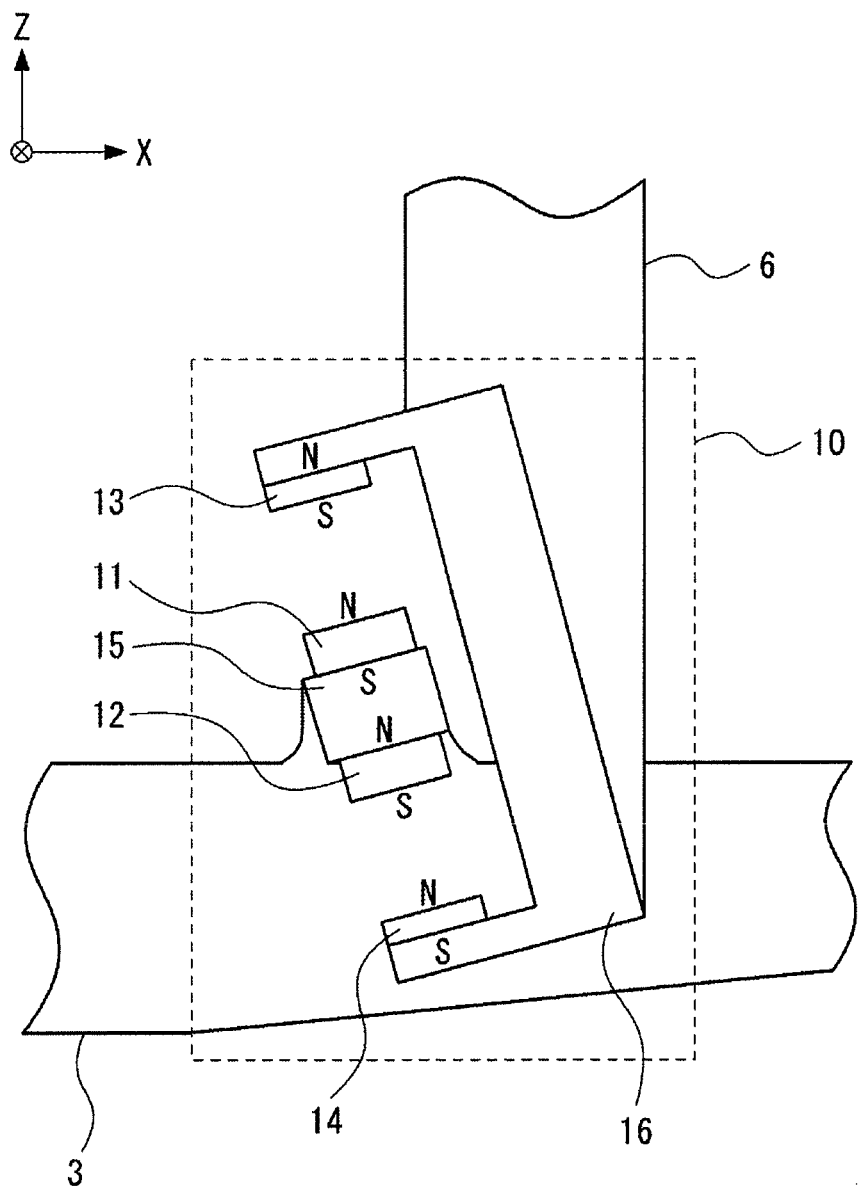
FIG. 2 is an enlarged front view of a vicinity of a measuring force adjuster according to the first embodiment.

The measuring force adjuster 10 is provided between the arm 3 and the measuring machine body 6 and is a mechanism which imparts, through a permanent magnet, a torque on the arm 3 in a reverse direction of the torque generated by the crossed spring of the rotation fulcrum 5. In FIG. 2, the measuring force adjuster 10 has permanent magnets 11 through 14, an arm-side magnet fixating part 15, and a body-side magnet fixating part 16.

The arm-side magnet fixating part 15 (also referred to as a first fixating part, first stabilizer or first immobilizer) is fixed to the arm 3. The permanent magnet 11 (also referred to as a first magnetic member) is fixed to a Z (+) side surface of the arm-side magnet fixating part 15 and the permanent magnet 12 (also referred to as the third magnetic member) is fixed to a Z (−) side surface of the arm-side magnet fixating part 15.

The body-side magnet fixating part 16 (also referred to as a second fixating part, second stabilizer or second immobilizer) is fixed to the measuring machine body 6. On the body-side magnet fixating part 16, the permanent magnet 13 (also referred to as a second magnetic member) is fixated at a position facing the permanent magnet 11 and the permanent magnet 14 (also referred to as a fourth magnetic member) is fixated at a position facing the permanent magnet 12.

In the present configuration, an attraction force generated by magnetic force acts on an area between the permanent magnet 11 and the permanent magnet 13. An attraction force generated by magnetic force acts on an area between the permanent magnet 12 and the permanent magnet 14. FIG. 2 is an enlarged front view of a vicinity of the measuring force adjuster 10 according to the first embodiment. In this example, a Z (+) side surface of each of the permanent magnets 11 through 14 is the north pole, and a Z (−) side of each of the permanent magnets 11 through 14 is the south pole. In addition, the permanent magnets 11 through 14 are preferably arranged so as to be aligned along the rotation direction of the arm 3 whose axis is the rotation fulcrum 5.

Figure 3:
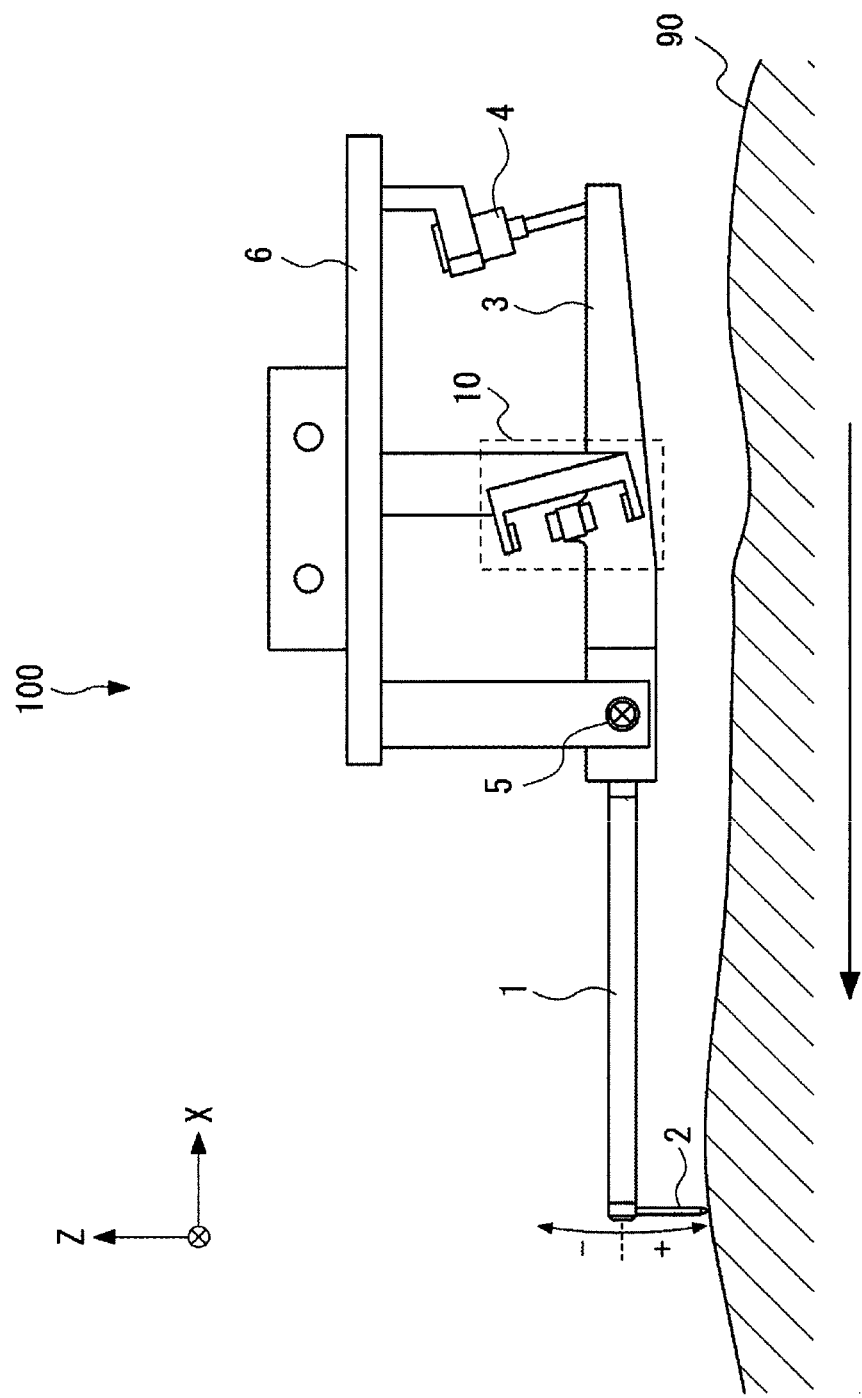
FIG. 3 is a front view of the form measuring machine according to the first embodiment in a measuring state.

Next, operation of the form measuring machine 100 is described. FIG. 3 is a front view of the form measuring machine 100 according to the first embodiment in a measuring state. When measuring, the probe 2 makes contact with a workpiece 90.

Figure 4:
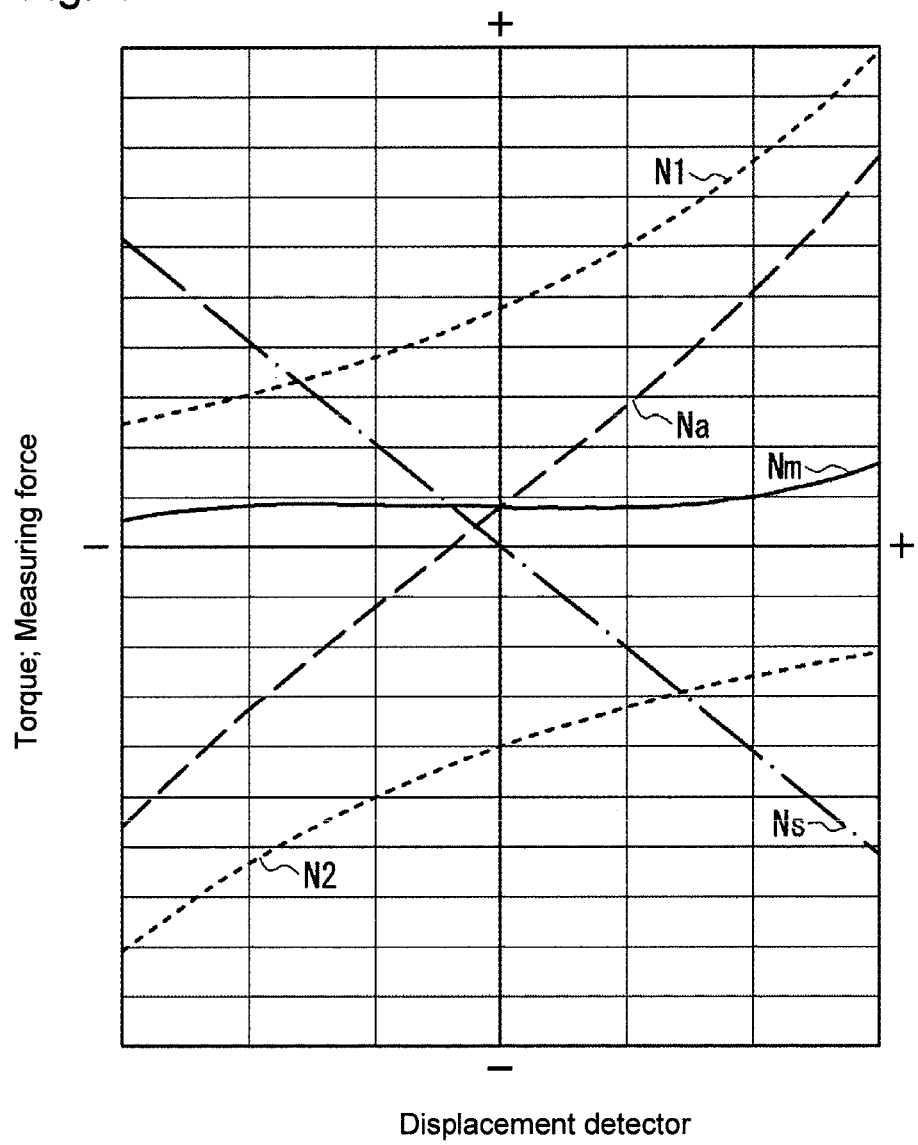
FIG. 4 is a graph illustrating forces (torques) which act upon the form measuring machine according to the first embodiment.

FIG. 4 is a graph illustrating forces (torques) which act upon the form measuring machine 100 according to the first embodiment. In FIG. 4, with respect to a displacement amount of the probe 2, displacement of the probe 2 in a counterclockwise direction with respect to the reference position is indicated as + and displacement of the probe 2 in a clockwise direction with respect to the reference position is indicated as −. In addition, with respect to torque, torque in the counterclockwise direction is indicated as + and torque in the clockwise direction is indicated as −. Further, in FIG. 4, torque generated by the permanent magnets 11 and 13 is indicated as N1, torque generated by the permanent magnets 12 and 14 is indicated as N2, torque generated by the measuring force adjuster 10 (combined torque of the permanent magnets 11 through 14) is indicated as Na, torque generated in the crossed spring of the rotation fulcrum 5 is indicated as Ns, and the measuring force is indicated as Nm. In the present embodiment, the torque Ns generated in the crossed spring of the rotation fulcrum 5 in the reference position is "0."

When the stem 1 and the arm 3 are in the reference position, no torque is generated by the crossed spring of the rotation fulcrum 5. In this state, a counterclockwise torque is generated by the permanent magnets 11 through 14 of the measuring force adjuster 10. Therefore, in the reference position, the measuring force is the counterclockwise torque generated by the permanent magnets 11 through 14 of the measuring force adjuster 10.

When measuring, the probe 2 is displaced along the form of the workpiece 90, and this causes the torque generated by the crossed spring of the rotation fulcrum 5 and the torque generated by the measuring force adjuster 10 to change.

As the probe 2 is displaced in the + direction (counterclockwise direction), the torque generated by the crossed spring of the rotation fulcrum 5 in the − direction (clockwise direction) increases and the torque generated by the measuring force adjuster 10 in the + direction (counterclockwise direction) increases. At this point, in a case where the probe 2 is displaced in the + direction (counterclockwise direction), the crossed spring of the rotation fulcrum 5 and the measuring force adjuster 10 are configured so that the torque generated by the crossed spring of the rotation fulcrum 5 is smaller than the torque generated by the measuring force adjuster 10, thereby enabling the measuring force to be imparted on the workpiece 90.

In addition, as the probe 2 is displaced in the − direction (clockwise direction), the torque generated by the crossed spring of the rotation fulcrum 5 in the + direction (counterclockwise direction) increases and the torque generated by the measuring force adjuster 10 in the − direction (clockwise direction) increases. In this state, in either case, the torque generated by the measuring force adjuster 10 acts to cancel the torque generated by the crossed spring of the rotation fulcrum 5, thereby inhibiting fluctuation of the probe 2 and stabilizing the measuring force. In a case where the probe 2 is displaced in the − direction (clockwise direction), the crossed spring of the rotation fulcrum 5 and the measuring force adjuster 10 are configured so that the torque generated by the crossed spring of the rotation fulcrum 5 is larger than the torque generated by the measuring force adjuster 10, thereby enabling the measuring force to be imparted on the workpiece 90.

As described above, the measuring force of the probe 2 is generated by a torque in the + direction which is a combination of the torque generated by the crossed spring of the rotation fulcrum 5 and the torque generated by the measuring force adjuster 10. In this state, the torque generated by the crossed spring of the rotation fulcrum 5 is in a reverse direction of the torque generated by the measuring force adjuster 10. Therefore, it can be understood that the present configuration allows for the measuring force to be reduced in contrast to a case where only the elastic member (the crossed spring) is used.

In addition, as illustrated in FIG. 4, while the torque generated by the crossed spring of the rotation fulcrum 5 increases in accordance with displacement from the reference position, the torque generated by the measuring force adjuster 10 also increases in accordance with displacement from the reference position. Thus, according to the present configuration, stabilization of the measuring force can be achieved regardless of the displacement amount from the reference position.

It is noted that when form measurement is performed using the form measuring machine 100, it is preferable to perform such measurement on a flat area so that the fluctuation of the measuring force Nm is as small as possible. By performing form measurement on such an area, it is possible to maintain a constant measuring force. As a result, friction generated between the tip of the probe 2 and the workpiece can be made substantially constant, thereby inhibiting measurement errors due to friction and achieving measurements with higher precision can be obtained. The same applies to form measuring machines according to embodiments described below.

In addition, in order to make a flat portion of the measuring force Nm to be on the + side, the torque Ns generated in the crossed spring of the rotation fulcrum 5 must be shifted to the plus side. As stated above, the reference position refers to the position in which displacement detected by the detector 4 is "0." That is, in a case where the crossed spring is used, the reference position is a position in which the stem 1 is rotated slightly toward the Z (+) side from a horizontal position. Alternatively, attachment positions of the permanent magnets of the measuring force adjuster 10 may be determined so that a torque is generated by the measuring force adjuster 10 in the reference position. In other words, the form measuring machine must be designed so that a torque is generated by at least one of the crossed spring and a measuring force adjuster in the reference position, so that the measuring force can be imparted on the workpiece. The same applies to the design of form measuring machines according to embodiments described below.

According to the present configuration, the measuring force of the form measuring machine can be stabilized by a simple configuration in which the measuring force adjuster having a magnetic member is provided in the form measuring machine. Further, in the present configuration, since there is no heat and electrical noise generated by controlling the measurement force, the measuring force can be stabilized without deteriorating measurement precision.

It is noted that the present embodiment is described as including the permanent magnets 11 through 14; however, this is only exemplary. One of the permanent magnets 11 and 13 may be a member composed of magnetic material. One of the permanent magnets 12 and 14 may be a member composed of magnetic material. In the present embodiment and the embodiments hereafter, a member composed of at least one of a permanent magnet and magnetic material shall be referred to also as a magnetic member.

Second Embodiment

Figure 5:
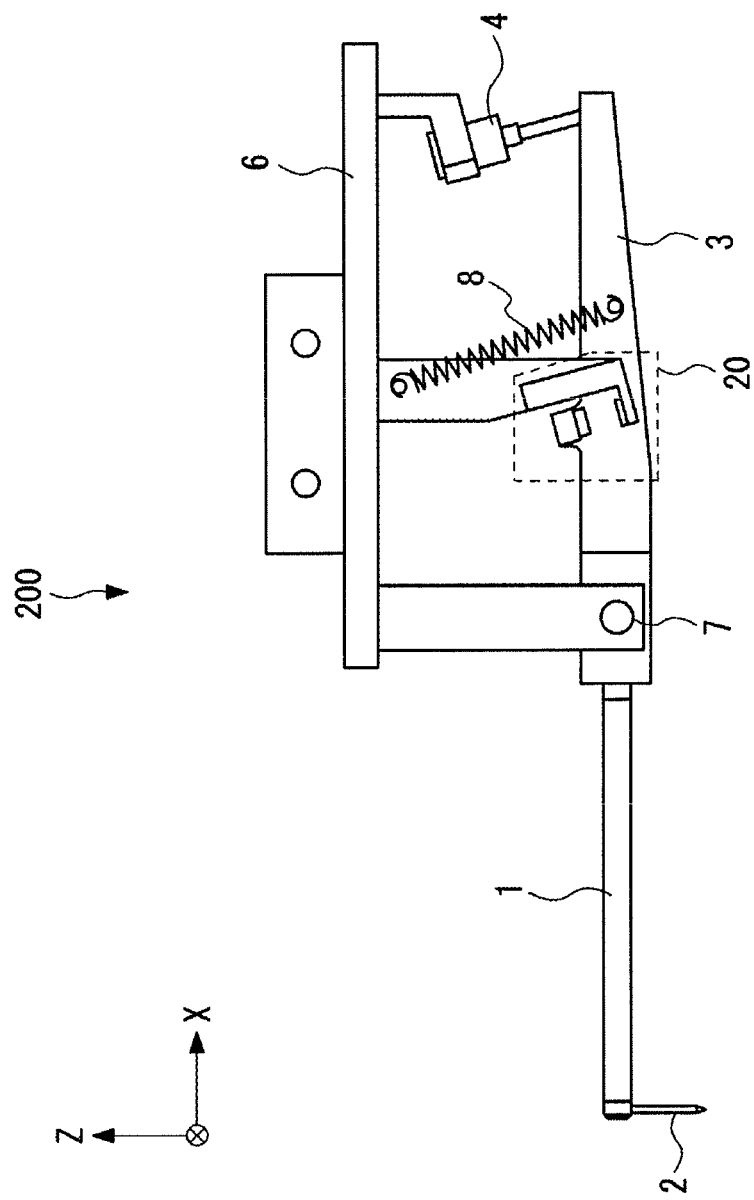
FIG. 5 is a front view schematically illustrating a configuration of a form measuring machine according to a second embodiment.

A description is given of a form measuring machine 200 according to a second embodiment. FIG. 5 is a front view schematically illustrating a configuration of the form measuring machine 200 according to the second embodiment. The form measuring machine 200 has the stem 1, the probe 2, the arm 3, the detector 4, the measuring machine body 6, a rotation fulcrum 7, a spring 8 (also referred to as the elastic member), and a measuring force adjuster 20. Since the stem 1, the probe 2, the arm 3, the detector 4, and the measuring machine body 6 of the form measuring machine 200 are similar to those of the form measuring machine 100 according to the first embodiment, descriptions thereof are omitted.

In the form measuring machine 200, the rotation fulcrum 5 of the form measuring machine 100 is replaced with the rotation fulcrum 7. Unlike the rotation fulcrum 5, the rotation fulcrum 7 does not have the crossed spring incorporated thereinto and thus does not generate torque.

The spring 8 which imparts a counterclockwise torque on the arm 3 is attached between the arm 3 and the measuring machine body 6.

Figure 6:
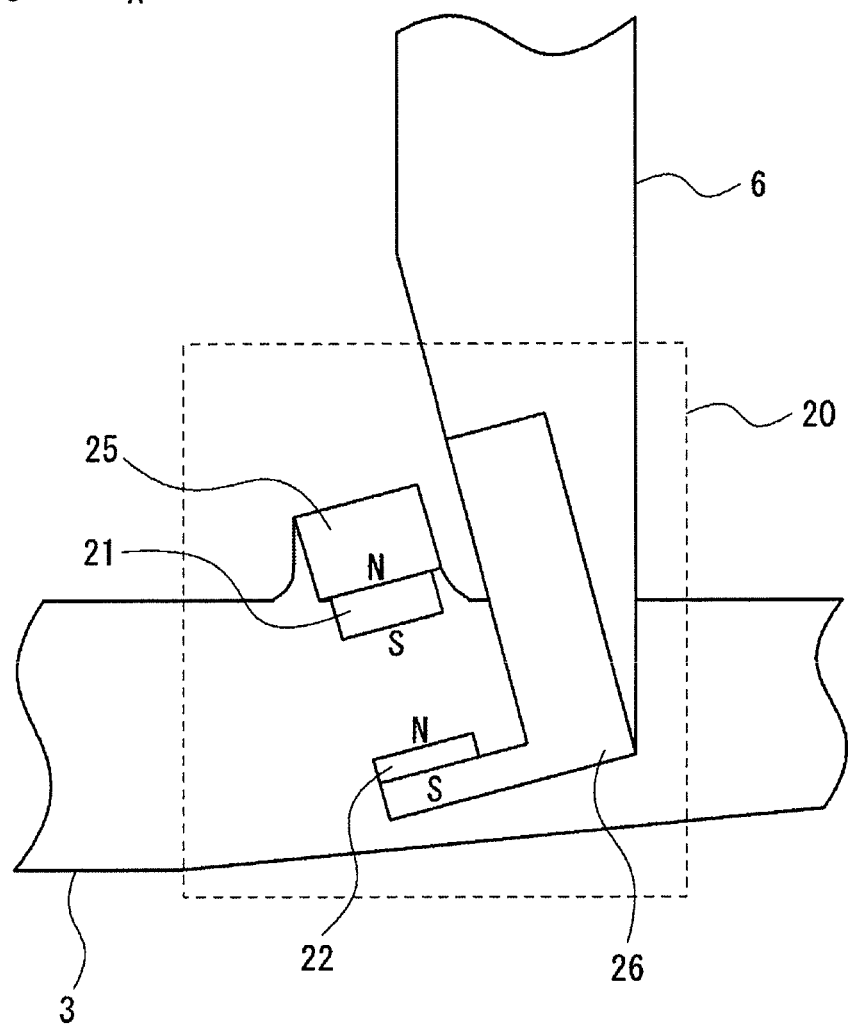
FIG. 6 is an enlarged front view of a vicinity of a measuring force adjuster according to the second embodiment.

FIG. 6 is an enlarged front view of a vicinity of the measuring force adjuster 20 according to the second embodiment. The measuring force adjuster 20 is provided between the arm 3 and the measuring machine body 6 and is a mechanism which reduces torque generated by the spring 8. The measuring force adjuster 20 has permanent magnets 21 and 22, an arm-side magnet fixating part 25 (also referred to as a third fixating part, third immobilizer or third stabilizer), and a body-side magnet fixating part 26 (also referred to as a fourth fixating part, fourth immobilizer or fourth stabilizer). The permanent magnets 21 and 22 (also referred to as an eighth magnetic member and a ninth magnetic member, respectively) correspond to the permanent magnets 12 and 14, respectively, of the measuring force adjuster 10 of the form measuring machine 100. The arm-side magnet fixating part 25 and the body-side magnet fixating part 26 correspond to the arm-side magnet fixating part 15 and the body-side magnet fixating part 16, respectively, of the measuring force adjuster 10 of the form measuring machine 100. Since torque generated by the permanent magnets 21 and 22 is similar to the torque generated by the permanent magnets 12 and 14 of the measuring force adjuster 10, description thereof is omitted.

Figure 7:
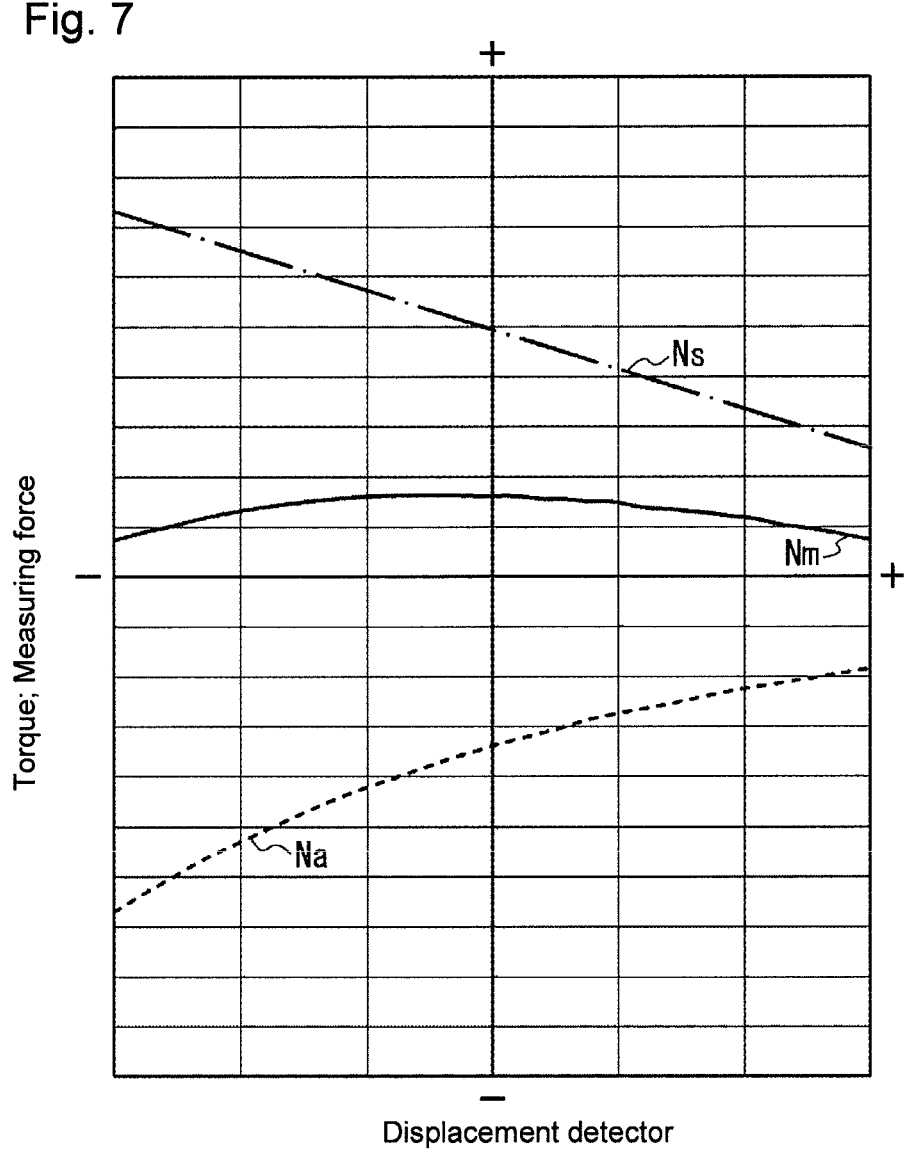
FIG. 7 is a graph illustrating forces (torques) which act upon the form measuring machine according to the second embodiment.

FIG. 7 is a graph illustrating forces (torques) which act upon the form measuring machine 200 according to the second embodiment. In FIG. 7, with respect to the displacement amount of the probe 2, displacement of the probe 2 in the counterclockwise direction with respect to the reference position is indicated as + and displacement of the probe 2 in the clockwise direction with respect to the reference position is indicated as −. In addition, with respect to torque, torque in the counterclockwise direction is indicated as + and torque in the clockwise direction is indicated as −. Further, in FIG. 7, torque generated in the measuring force adjuster 20 (torque generated by the permanent magnets 21 and 22) is indicated as Na, torque generated in the spring 8 is indicated as Ns, and the measuring force is indicated as Nm.

In a case where the stem 1 and the arm 3 are in the reference position, the counterclockwise (+) torque is generated by the spring 8 and the clockwise (−) torque is generated by the measuring force adjuster 20. The measuring force Nm is provided by a combined torque of these torques (Na and Ns) and is in the counterclockwise (+) direction.

When measuring, the probe 2 is displaced along the form of the workpiece 90, and this causes the torque generated by the spring 8 and the torque generated by the measuring force adjuster 20 to change.

As the probe 2 is displaced in the + direction (counterclockwise direction), the torque generated by the spring 8 in the + direction (counterclockwise direction) decreases and the torque generated by the measuring force adjuster 20 in the − direction (clockwise direction) also decreases. As the probe 2 is displaced in the − direction (clockwise direction), the torque generated by the spring 8 in the + direction (counterclockwise direction) increases and the torque generated by the measuring force adjuster 20 in the − direction (clockwise direction) also increases.

In this state, in either case, the torque generated by the measuring force adjuster 20 acts to cancel the torque generated by the spring 8, and this inhibits fluctuation of the probe 2 and measuring force can be stabilized. The spring 8 and the measuring force adjuster 20 are configured so that the torque generated by the spring 8 does not become smaller than the torque generated by the measuring force adjuster 20, thereby enabling the measuring force to be imparted on the workpiece 90.

As described above, the measuring force of the probe 2 is generated by a torque in the + direction which is a combination of the torque generated by the spring 8 and the torque generated by the measuring force adjuster 20. At this time, the torque generated by the spring 8 is in a reverse direction of the torque generated by the measuring force adjuster 20. Therefore, similarly to the first embodiment, it can be understood that the present configuration allows for measuring force to be reduced in contrast to a case where only the elastic member (a spring) is used.

In addition, as illustrated in FIG. 7, while the torque generated by the spring 8 changes in accordance with displacement from the reference position, the torque generated by the measuring force adjuster 20 also changes in accordance with displacement from the reference position. Thus, according to the present configuration, stabilization of measuring force can be achieved regardless of the displacement amount from the reference position.

It is noted that the present embodiment is described as including the permanent magnets 21 and 22; however, this is only exemplary. One of the permanent magnets 21 and 22 may be a member composed of magnetic material.

Third Embodiment

Figure 8:
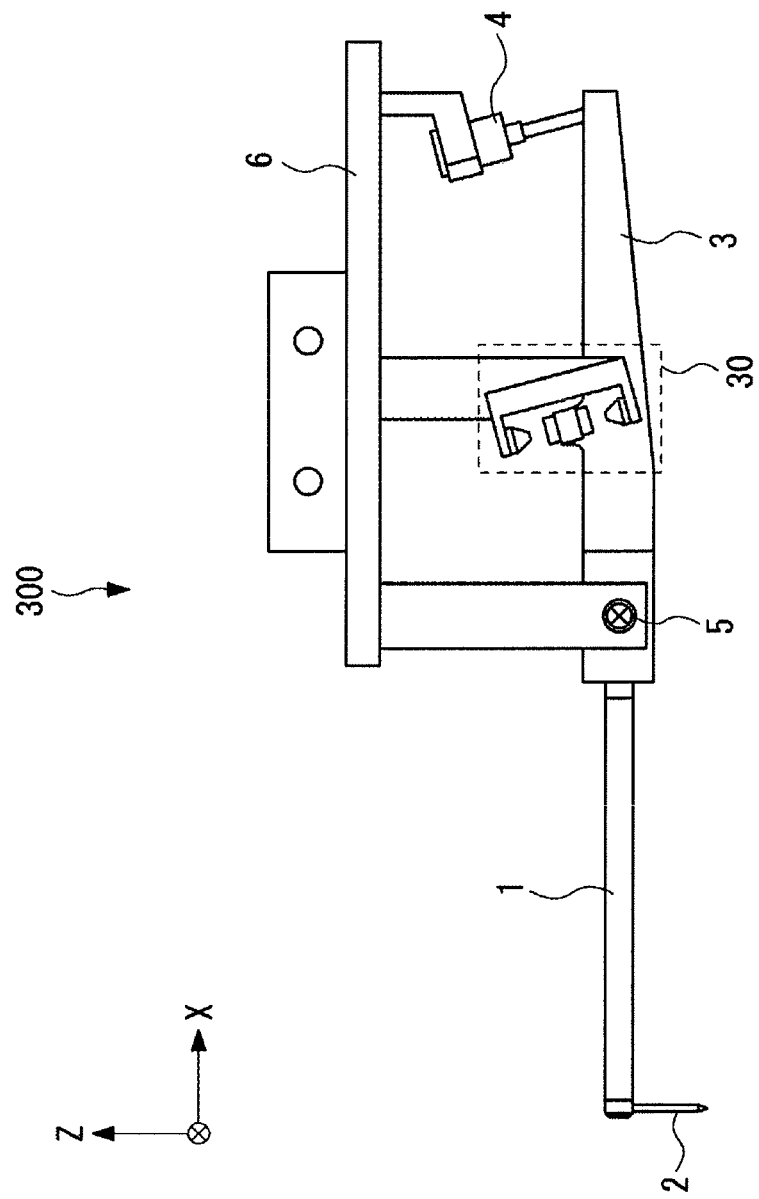
FIG. 8 is a front view schematically illustrating a configuration of a form measuring machine according to a third embodiment.

A description is given of a form measuring machine 300 according to a third embodiment. FIG. 8 is a front view schematically illustrating a configuration of the form measuring machine 300 according to the third embodiment. The form measuring machine 300 has a configuration in which the measuring force adjuster 10 according to the first embodiment is replaced with a measuring force adjuster 30. Since the remaining configuration of the form measuring machine 300 is similar to that of the form measuring machine 100, description thereof is omitted.

Figure 9:
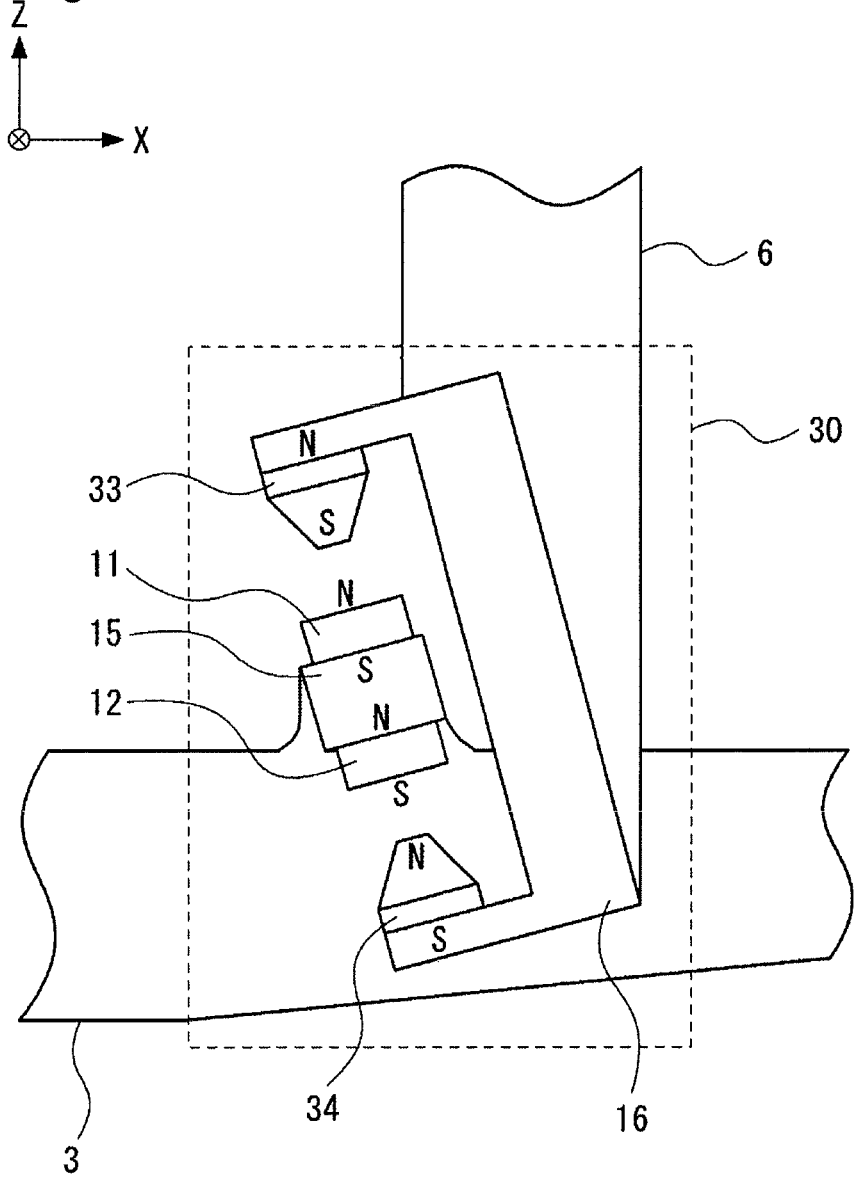
FIG. 9 is an enlarged front view of a vicinity of a measuring force adjuster according to the third embodiment.

FIG. 9 is an enlarged front view of a vicinity of the measuring force adjuster 30 according to the third embodiment. The measuring force adjuster 30 is provided between the arm 3 and the measuring machine body 6 and is a mechanism which imparts, through a permanent magnet, a torque on the arm 3 in a reverse direction of the torque generated by the crossed spring of the rotation fulcrum 5. The measuring force adjuster 30 has a configuration in which the permanent magnets 13 and 14 of the measuring force adjuster 10 according to the first embodiment are replaced with permanent magnets 33 and 34, respectively.

Unlike the permanent magnet 13, the permanent magnet 33 (also referred to as the second magnetic member) has a tapered shape (or a conical shape) whose width narrows toward the permanent magnet 11. Unlike the permanent magnet 14, the permanent magnet 34 (also referred to as the fourth magnetic member) has a tapered shape (or a conical shape) whose width narrows toward the permanent magnet 12.

As described above, according to the present configuration, by changing the shape of the permanent magnets in the measuring force adjuster 30, fine adjustments can be made to the torque generated in the measuring force adjuster 30 using magnetic force. This allows for the torque generated by the measuring force adjuster 30 to be changed more linearly with respect to displacement of the probe 2. As a result, compared to the first embodiment, further stabilization of the measuring force can be achieved regardless of the displacement amount from the reference position.

It is noted that although the permanent magnets 33 and 34 have a tapered shape in the present embodiment, the permanent magnets 11 and 12 may have a tapered shape instead. In addition, the permanent magnets 11, 12, 33, and 34 may have a tapered shape.

Fourth Embodiment

Figure 10:
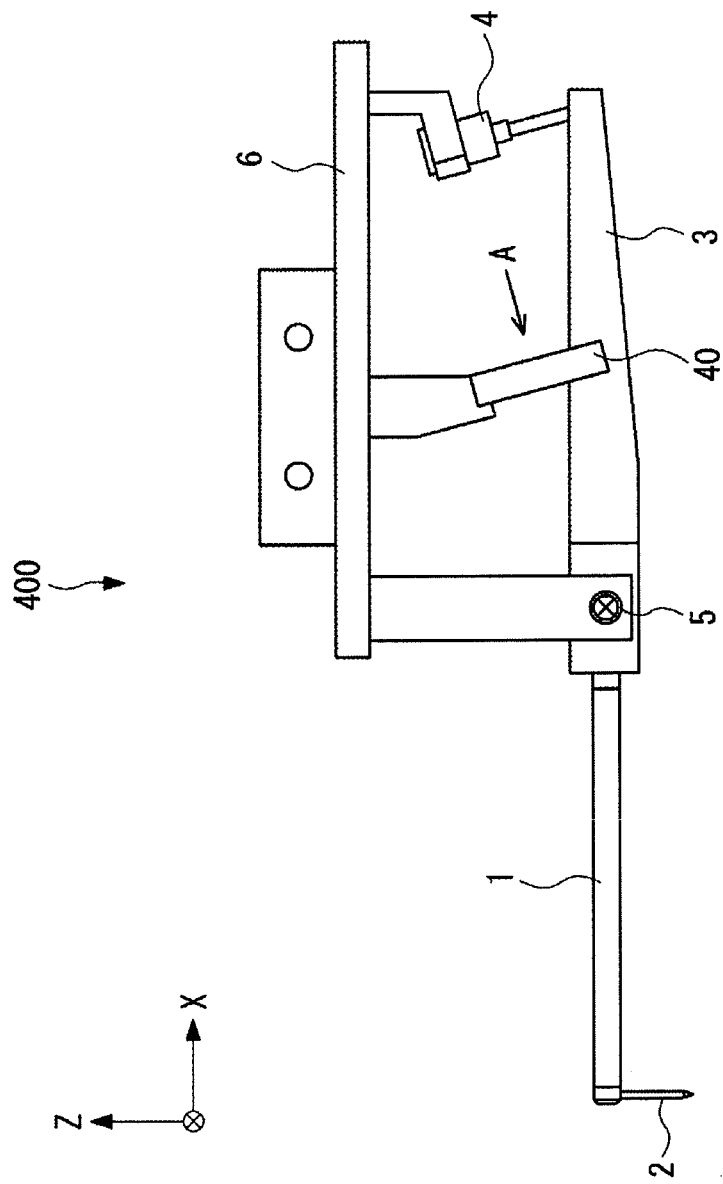
FIG. 10 is a front view schematically illustrating a configuration of a form measuring machine according to a fourth embodiment.

A description is given of a form measuring machine 400 according to a fourth embodiment. FIG. 10 is a front view schematically illustrating a configuration of the form measuring machine 400 according to the fourth embodiment. The form measuring machine 400 has a configuration in which the measuring force adjuster 10 according to the first embodiment is replaced with a measuring force adjuster 40. Since the remaining configuration of the form measuring machine 400 is similar to that of the form measuring machine 100, description thereof is omitted.

Figure 11:
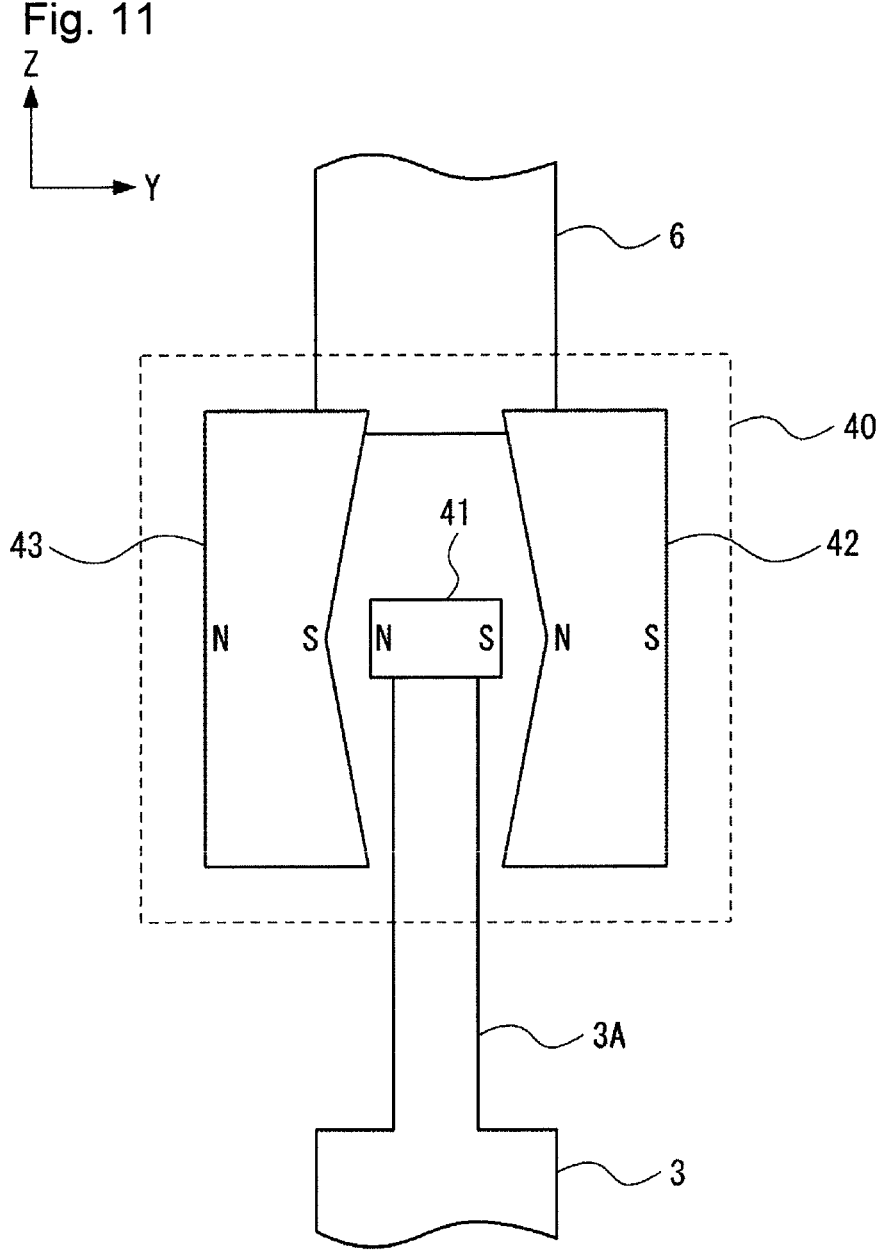
FIG. 11 is an enlarged view of a measuring force adjuster according to the fourth embodiment when viewed from direction A as indicated in FIG. 10.

FIG. 11 is an enlarged view of the measuring force adjuster 40 according to the fourth embodiment when viewed from direction A as indicated in FIG. 10. The measuring force adjuster 40 is provided between the arm 3 and the measuring machine body 6 and is a mechanism which imparts, through a permanent magnet, a torque on the arm 3 in a reverse direction of the torque generated by the crossed spring of the rotation fulcrum 5. The measuring force adjuster 40 has permanent magnets 41 through 43 (also referred to as a fifth magnetic member, a sixth magnetic member, and a seventh magnetic member, respectively).

The permanent magnet 41 is attached to an upper portion (end portion on the Z (+) side) of a fixating part 3A extending from the arm 3 toward the Z (+) side. A Y (+) side of the permanent magnet 41 is the south pole and a Y (−) side of the permanent magnet 41 is the north pole.

The permanent magnets 42 and 43 are attached to a Z (−) surface of the measuring machine body 6 so as to be separated from each other in the Y direction. A Y (+) side surface of each of the permanent magnets 42 and 43 is the south pole and a Y (−) side surface of each of the permanent magnets 41 and 43 is the north pole. The permanent magnets 42 and 43 are formed so that a distance between the permanent magnets 42 and 43 and the permanent 41 is largest in the reference position (position of the permanent magnet 41 in FIG. 11) and the distance between the permanent magnets 42 and 43 and the permanent 41 gradually decreases toward the Z (+) side and the Z (−) side from the reference position.

As described above, similarly to the first embodiment, in the measuring force adjuster 40, torque generated in the measuring force adjuster 40 can be increased by magnetic force in accordance with displacement of the probe 2. Thus, similarly to the first embodiment, reduction and stabilization of the measuring force can be achieved.

It is noted that although the above description includes the permanent magnets 42 and 43, the torque generated in the measuring force adjuster 40 can be increased by magnetic force in accordance with displacement of the probe 2 as in the first embodiment as long as one of the permanent magnets 42 and 43 is provided.

The present embodiment is described as including the permanent magnets 41 through 43; however, this is only exemplary. One of the permanent magnets 41 and 42 may be composed of magnetic material. One of the permanent magnets 41 and 43 may be a member composed of magnetic material.

Fifth Embodiment

Figure 12:
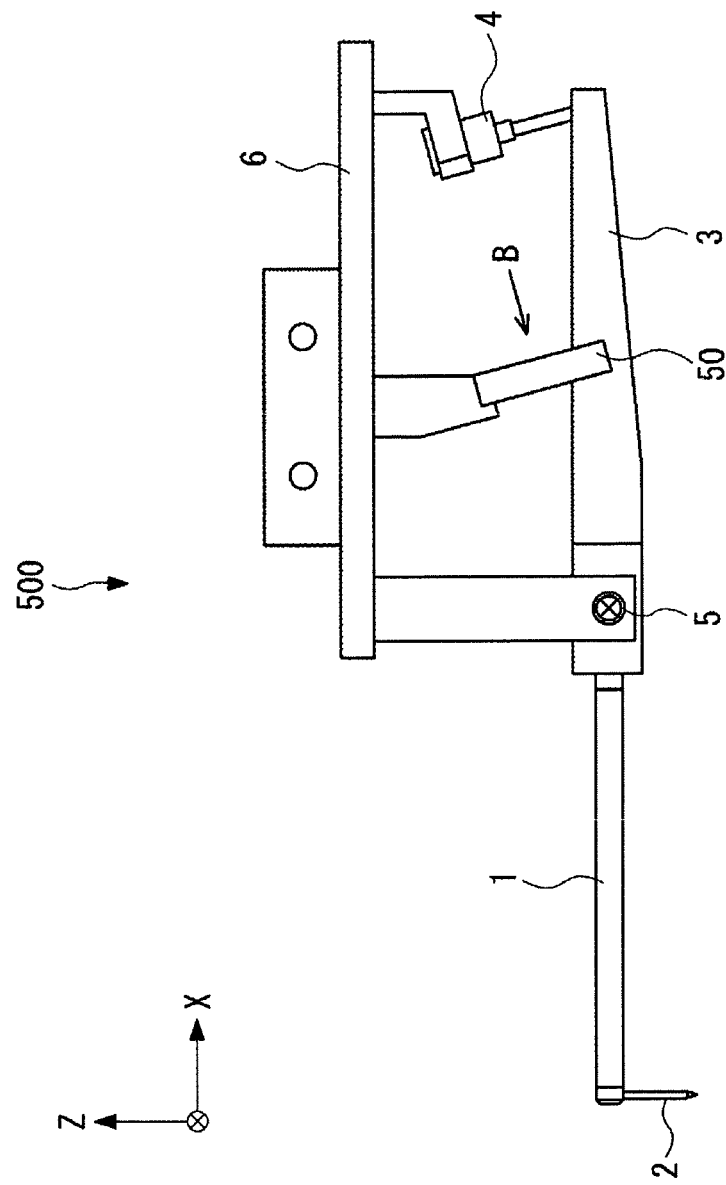
FIG. 12 is a front view schematically illustrating a configuration of a form measuring machine according to a fifth embodiment.

A description is given of a form measuring machine 500 according to a fifth embodiment. FIG. 12 is a front view schematically illustrating a configuration of the form measuring machine 500 according to the fifth embodiment. The form measuring machine 500 has a configuration in which the measuring force adjuster 40 according to the fourth embodiment is replaced with a measuring force adjuster 50. Since the remaining configuration of the form measuring machine 500 is similar to that of the form measuring machine 400, description thereof is omitted.

Figure 13:
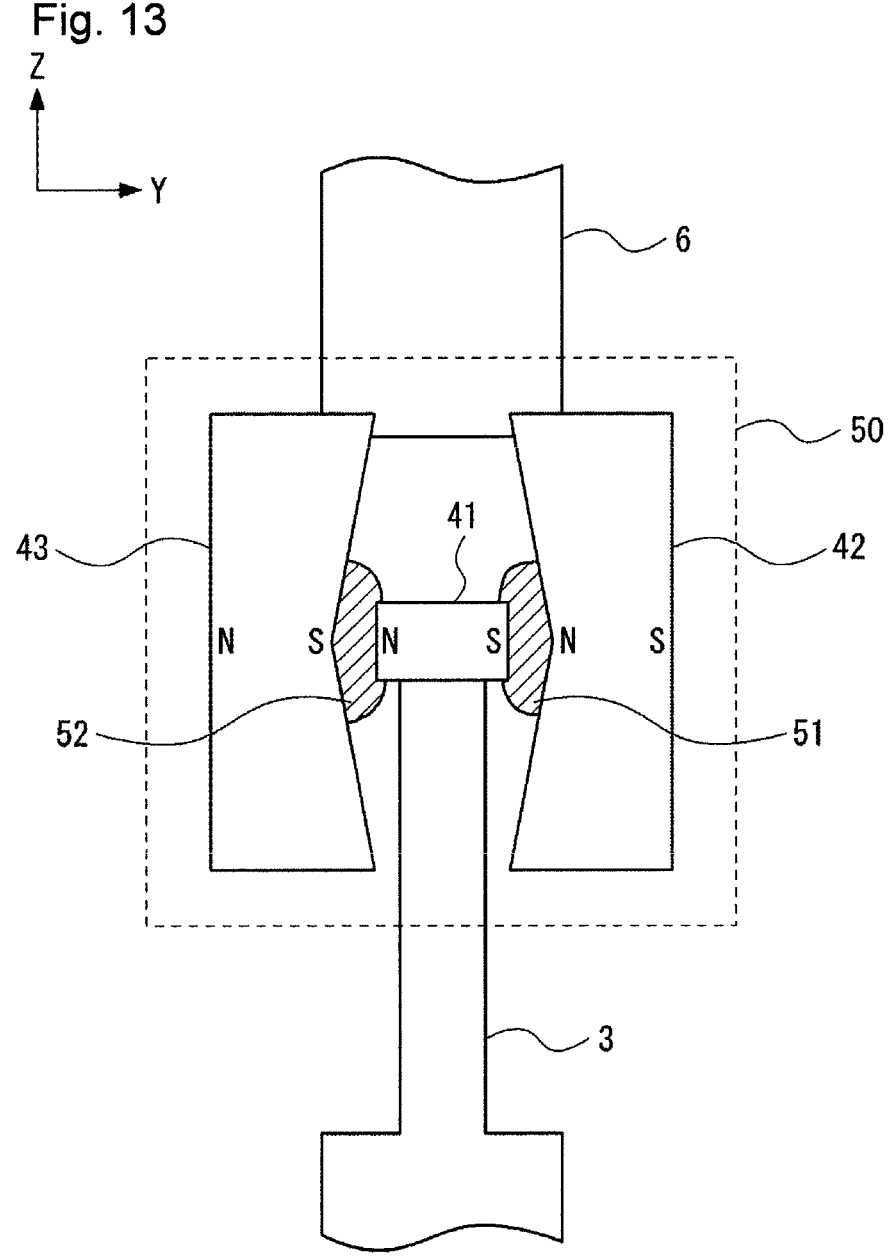
FIG. 13 is an enlarged view of a measuring force adjuster according to the fifth embodiment when viewed from direction B as indicated in FIG. 12.

FIG. 13 is an enlarged view of the measuring force adjuster 50 according to the fifth embodiment when viewed from direction B as indicated in FIG. 12. Similarly to the measuring force adjuster 40, the measuring force adjuster 50 is provided between the arm 3 and the measuring machine body 6 and is a mechanism which imparts, through a permanent magnet, a torque on the arm 3 in a reverse direction of the torque generated by the crossed spring of the rotation fulcrum 5. However, the measuring force adjuster 50 has a configuration in which magnetic fluids 51 and 52 are added to the measuring force adjuster 40.

The magnetic fluid 51 is filled between the permanent magnet 41 and the permanent magnet 42. The magnetic fluid 52 is filled between the permanent magnet 41 and the permanent magnet 43. When the permanent magnet 41 is displaced, the magnetic fluids 51 and 52 are drawn by the magnetic force of the permanent magnet 41 and move with the permanent magnet 41.

As described above, in the measuring force adjuster 50, magnetic force can be increased due to the existence of magnetic fluids between the permanent magnets. As a result, the measuring force adjuster can be downsized compared to the fourth embodiment.

It is noted that although the above description includes the magnetic fluids 51 and 52, the torque generated in the measuring force adjuster 50 can be increased by magnetic force in accordance with displacement of the probe 2 as in the fourth embodiment as long as one of the magnetic fluids 51 and 52 is provided.

Other Embodiments

It is noted that the present invention is not limited to the embodiments described above, and may be modified as needed without departing from the scope of the present invention. In the embodiments described above, the distance between the magnetic members mutually arranged at opposite ends can be changed according to a measurement purpose. That is, a mechanism in which the distance between the magnetic members mutually arranged at opposite ends is changeable may be added to the measuring force adjuster according to the embodiments described above, and the distance between the magnetic members mutually arranged at opposite ends may be changed as needed before commencement of measurement. That is, in the embodiments described above, the distance between the permanent magnet 11 and the permanent magnet 13, the distance between the permanent magnet 12 and the permanent magnet 14, the distance between the permanent magnet 21 and the permanent magnet 22, the distance between the permanent magnet 11 and the permanent magnet 33, the distance between the permanent magnet 12 and the permanent magnet 34, the distance between the permanent magnet 41 and the permanent magnet 42, and the distance between the permanent magnet 41 and the permanent magnet 43 can each be changed. Changing the distance between mutually opposing magnetic members enables handling of measurements requiring a high measuring force, and deformation of and damages to the workpiece (object to be measured) can be inhibited by decreasing the measuring force.

In the form measuring machine according to the second embodiment, at least one of the mutually opposing magnetic members (the permanent magnets 21 and 22) can have a tapered shape as in the third embodiment. Further, the measuring force adjuster 40 according to the fourth embodiment or the measuring force adjuster 50 according to the fifth embodiment can be applied to the form measuring machine according to the second embodiment.

The stem 1 (the first member) and the arm 3 (the second member) are independent of one another in the embodiments described above; however, this is only exemplary. Thus, the stem 1 (the first member) and the arm 3 (the second member) can be an integrated member.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A form measuring machine, comprising:
a stem having a probe configured to make contact with a workpiece;
a arm having one end portion joined to an end portion of the stem;
a rotation fulcrum which acts as a fulcrum for a rotating motion of the stem and the arm;
a detector configured to detect a displacement amount of the rotating motion of the arm;
a biaser configured to impart on the stem and the arm a torque around an axis of the rotating motion in accordance with the displacement amount of the rotating motion; and
a measuring force adjuster configured to impart on the stem and the arm a torque, in a reverse direction of the torque generated by the biaser, by an attraction force generated by a magnetic force between at least two magnets mutually arranged at opposite ends of the measuring force adjuster.

2. The form measuring machine according to claim 1, wherein:
the biaser is a crossed spring incorporated into the rotation fulcrum, and
in a state where the crossed spring does not impart torque on the stem and the arm, the measuring force adjuster imparts on the stem and the arm a torque in a first direction such that the probe is pressed against the workpiece.

3. The form measuring machine according to claim 2, wherein:
in a case where the crossed spring imparts on the stem and the arm the torque in the first direction, the torque generated by the crossed spring is larger than the torque generated by the measuring force adjuster, and
in a case where the crossed spring imparts on the stem and the arm a torque in a second direction which is opposite to the first direction, the torque generated by the crossed spring is smaller than the torque generated by the measuring force adjuster.

4. The form measuring machine according to claim 3, wherein:
the measuring force adjuster comprises:
a first stabilizer joined to the arm;
a second stabilizer whose relative position with respect to the rotation fulcrum is fixated;
a first magnet fixed to the first stabilizer;
a second magnet fixed to the second stabilizer such that an attraction force in a circumferential direction of the rotating motion is generated between the first magnet and the second magnet;
a third magnet fixed to the first stabilizer; and
a fourth magnet fixed to the second stabilizer such that an attraction force in the circumferential direction of the rotating motion is generated between the third magnet and the fourth magnet, and
the third magnet is arranged so as to face the first magnet in the circumferential direction of the rotating motion via the first stabilizer.

5. The form measuring machine according to claim 4, wherein:
at least one of the first magnet and the second magnet has a tapered shape having a cross section which becomes smaller toward the other of the at least one of the first magnet and the second magnet, and
at least one of the third magnet and the fourth magnet has a tapered shape having a cross section which becomes smaller toward the other of the at least one of the third magnet and the fourth magnet.

6. The form measuring machine according to claim 4, wherein:
at least one of the first magnet and the second magnet is a permanent magnet, and
at least one of the third magnet and the fourth magnet is a permanent magnet.

7. The form measuring machine according to claim 4, wherein at least one of a distance between the first magnet and the second magnet and a distance between the third magnet and the fourth magnet is changeable in accordance with measurement conditions and is constant when measuring the workpiece.

8. The form measuring machine according to claim 3, wherein:
the measuring force adjuster comprises:
a fifth magnet joined to the arm, and
a sixth magnet separated from the fifth magnet and arranged such that an attraction force in a direction intersecting with the circumferential direction of the rotating motion is generated between the fifth magnet and the sixth magnet, and whose relative position with respect to the rotation fulcrum is fixated,
a distance between the fifth magnet and the sixth magnet is largest when a center portion of the sixth magnet in the circumferential direction of the rotating motion faces the fifth magnet, and
the distance between the fifth magnet and the sixth magnet is smallest when a position of the sixth magnet facing the fifth magnet moves away from the fifth magnet in the circumferential direction of the rotating motion.

9. The form measuring machine according to claim 8, further comprising magnetic fluid inserted between the fifth magnet and the sixth magnet.

10. The form measuring machine according to claim 8, wherein at least one of the fifth magnet and the sixth magnet is a permanent magnet.

11. The form measuring machine according to claim 8, wherein the distance between the fifth magnet and the sixth magnet is changeable in accordance with measurement conditions and is constant when measuring the workpiece.

12. The form measuring machine according to claim 8, further comprising:
a seventh magnet separated from the fifth magnet and arranged such that an attraction force in a direction intersecting with the circumferential direction of the rotating motion is generated between the fifth magnet and the seventh magnet, and whose relative position with respect to the rotation fulcrum is fixated, wherein:

a distance between the fifth magnet and the seventh magnet is largest when the center portion of the seventh magnet in the circumferential direction of the rotating motion faces the fifth magnet, the distance between the fifth magnet and the seventh magnet is smallest when a position of the seventh magnet facing the fifth magnet moves away from the fifth magnet in the circumferential direction of the rotating motion, and the sixth magnet and the seventh magnet are mutually arranged on opposite ends of the measuring force adjuster with the fifth magnet therebetween.

13. The form measuring machine according to claim 12, further comprising magnetic fluid inserted between the fifth magnet and the seventh magnet.

14. The form measuring machine according to claim 12, wherein at least one of the fifth magnet and the seventh magnet is a permanent magnet.

15. The form measuring machine according to claim 12, wherein the distance between the fifth magnet and the seventh magnet is changeable in accordance with measurement conditions and is constant when measuring the workpiece.

16. The form measuring machine according to claim 3, wherein:

one end of the biaser is fixed to the arm and a relative position of another end of the biaser with respect to the rotation fulcrum is fixated, and the biaser imparts on the arm a torque in a direction with which the probe is pushed against the workpiece, and the measuring force adjuster comprises:
a third stabilizer joined to the arm;
a fourth stabilizer whose relative position with respect to the rotation fulcrum is fixated;
an eighth magnet fixed to the third stabilizer; and
a ninth magnet fixed to the fourth stabilizer such that an attraction force in the circumferential direction of the rotating motion is generated between the eighth magnet and the ninth magnet.

17. The form measuring machine according to claim 16, wherein at least one of the eighth magnet and the ninth magnet has a tapered shape having cross section which becomes smaller toward the other of the at least one of the eighth magnet and the ninth magnet.

18. The form measuring machine according to claim 16, wherein at least one of the eighth magnet and the ninth magnet is a permanent magnet.

19. The form measuring machine according to claim 16, wherein a distance between the eighth magnet and the ninth magnet is changeable in accordance with measurement conditions and is constant when measuring the workpiece.

* * * * *